(12) United States Patent
Stein et al.

(10) Patent No.: US 9,096,393 B2
(45) Date of Patent: Aug. 4, 2015

(54) CONVEYING OF PRE-FORMS WITH INDIVIDUAL EJECTION ABILITY

(71) Applicant: KRONES AG, Neutraubling (DE)

(72) Inventors: Marcus Stein, Dresden (DE); Wolfgang Schoenberger, Brennberg (DE)

(73) Assignee: KRONES AG (DE)

( * ) Notice: Subject to any disclaimer, the term of this patent is extended or adjusted under 35 U.S.C. 154(b) by 39 days.

(21) Appl. No.: 13/781,175

(22) Filed: Feb. 28, 2013

(65) Prior Publication Data

US 2013/0220769 A1  Aug. 29, 2013

(30) Foreign Application Priority Data

Feb. 29, 2012  (DE) .................. 10 2012 101 653

(51) Int. Cl.
*B65G 47/34* (2006.01)
*B29C 49/42* (2006.01)

(52) U.S. Cl.
CPC .............. *B65G 47/34* (2013.01); *B29C 49/42* (2013.01); *B29C 49/4205* (2013.01)

(58) Field of Classification Search
CPC .......................... B29C 49/42; B29C 49/4205
See application file for complete search history.

(56) References Cited

U.S. PATENT DOCUMENTS

| | | | |
|---|---|---|---|
| 5,404,227 A * | 4/1995 | Sumita et al. ............... | 356/428 |
| 5,591,462 A * | 1/1997 | Darling et al. ............... | 425/173 |
| 5,863,571 A * | 1/1999 | Santais et al. ............... | 425/526 |
| 6,168,749 B1 * | 1/2001 | Koch ........................... | 264/529 |
| 6,189,701 B1 * | 2/2001 | Winter ......................... | 209/523 |
| 7,399,435 B2 * | 7/2008 | Dunzinger et al. .......... | 264/40.1 |
| 7,541,556 B2 * | 6/2009 | Canepa ........................ | 209/524 |
| 7,780,898 B2 * | 8/2010 | Birckbichler et al. ....... | 264/408 |
| 7,789,655 B2 * | 9/2010 | Klatt et al. .................. | 425/540 |
| 8,505,268 B2 * | 8/2013 | Stoiber et al. ................ | 53/55 |
| 8,538,714 B2 * | 9/2013 | Heuft .......................... | 702/82 |

(Continued)

FOREIGN PATENT DOCUMENTS

| DE | 19746150 | 4/1999 | .............. B07C 5/06 |
|---|---|---|---|
| DE | 20114032 | 11/2002 | ............ B65G 47/38 |

(Continued)

OTHER PUBLICATIONS

German Search Report issued in corresponding application No. 10 2012 101 653.4, dated Jan. 9, 2013 (5 pgs).
European Search Report issued in corresponding application No. 113157276.0-1706, dated Jun. 5, 2013 (5 pgs).

*Primary Examiner* — Gene Crawford
*Assistant Examiner* — Thomas Randazzo
(74) *Attorney, Agent, or Firm* — Hayes Soloway P.C.

(57) ABSTRACT

An apparatus for conveying of plastics material pre-forms, with a plurality of holding devices which engage in apertures of the plastics material pre-forms and hold them, wherein these holding devices are movable along a pre-set conveying path, with a movement mechanism which has the effect that, in addition to the movement along the conveying path, the holding devices are also movable in a direction at a right angle to this conveying path. The apparatus has at least one detection device which is suitable for detecting a defective state of a plastics material pre-form held by a holding device, and at least one first removal apparatus arranged downstream along the conveying path of the at least one detection device and which—in reaction to a signal of the detection device—permits individual removal of a defective pre-form from the holding device.

13 Claims, 12 Drawing Sheets

(56) References Cited

U.S. PATENT DOCUMENTS

| | | | |
|---|---|---|---|
| 8,684,725 B2* | 4/2014 | Schmitt et al. | 425/526 |
| 8,704,674 B2* | 4/2014 | Morand | 198/502.1 |
| 2003/0020193 A1* | 1/2003 | Hamamoto et al. | 264/40.1 |
| 2005/0259860 A1* | 11/2005 | Lewin et al. | 382/141 |
| 2010/0324723 A1* | 12/2010 | Zech | 700/223 |
| 2011/0033269 A1* | 2/2011 | Bierschneider | 414/222.02 |
| 2011/0120833 A1* | 5/2011 | Tanner | 198/444 |
| 2012/0038090 A1* | 2/2012 | Voth | 264/535 |
| 2013/0208105 A1* | 8/2013 | Schmidt et al. | 348/92 |

FOREIGN PATENT DOCUMENTS

| | | | |
|---|---|---|---|
| DE | 102004024277 | 12/2005 | B07C 5/342 |
| DE | 102008020520 | 10/2009 | B65G 43/00 |
| DE | 102009004819 | 7/2010 | B29C 49/42 |
| DE | 102010028984 | 11/2011 | B65G 47/34 |
| FR | 1922272 | 3/2007 | B29C 49/36 |
| WO | WO0189790 | 11/2001 | B29C 31/08 |

* cited by examiner

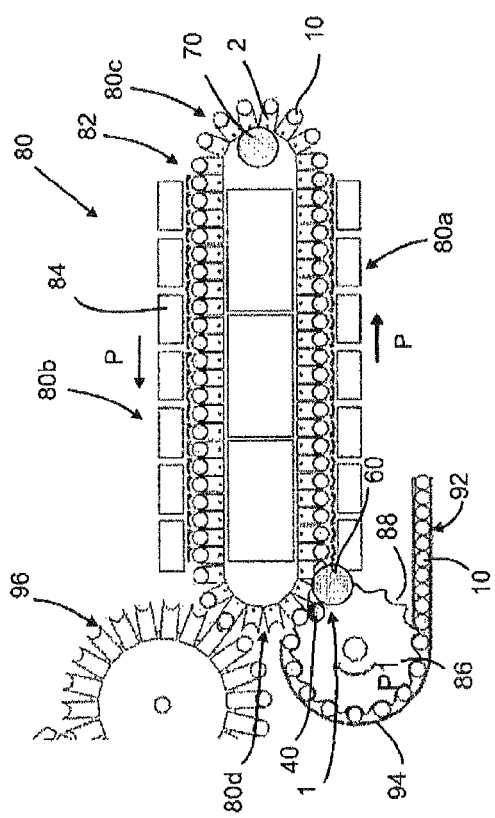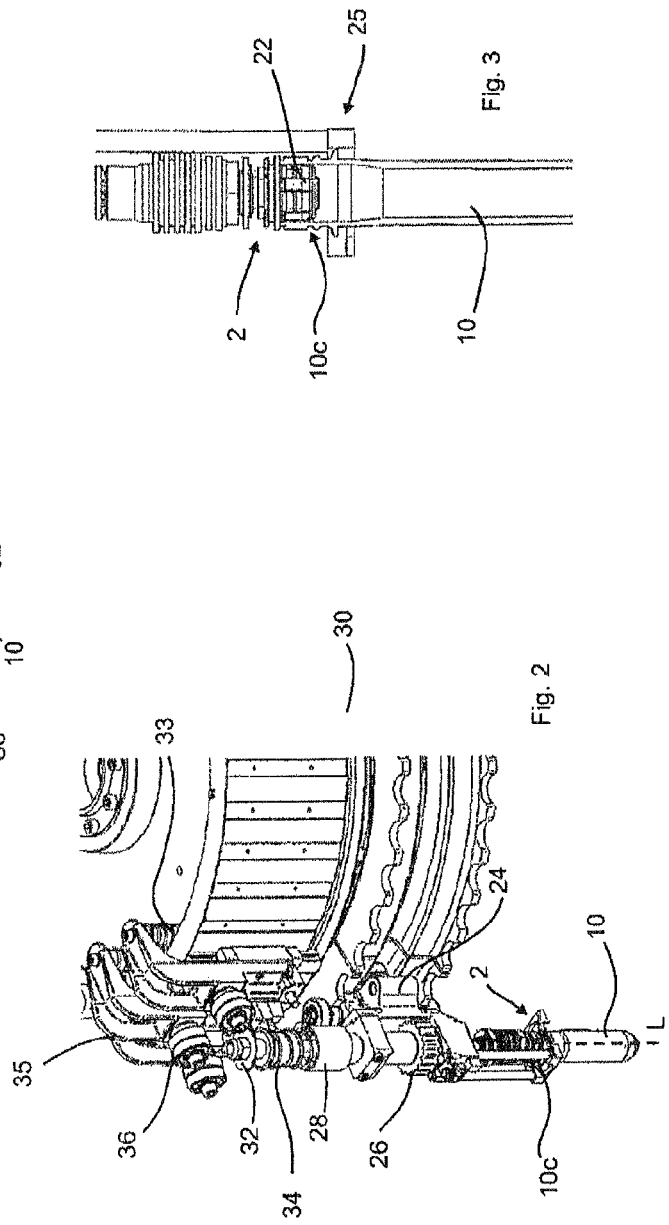

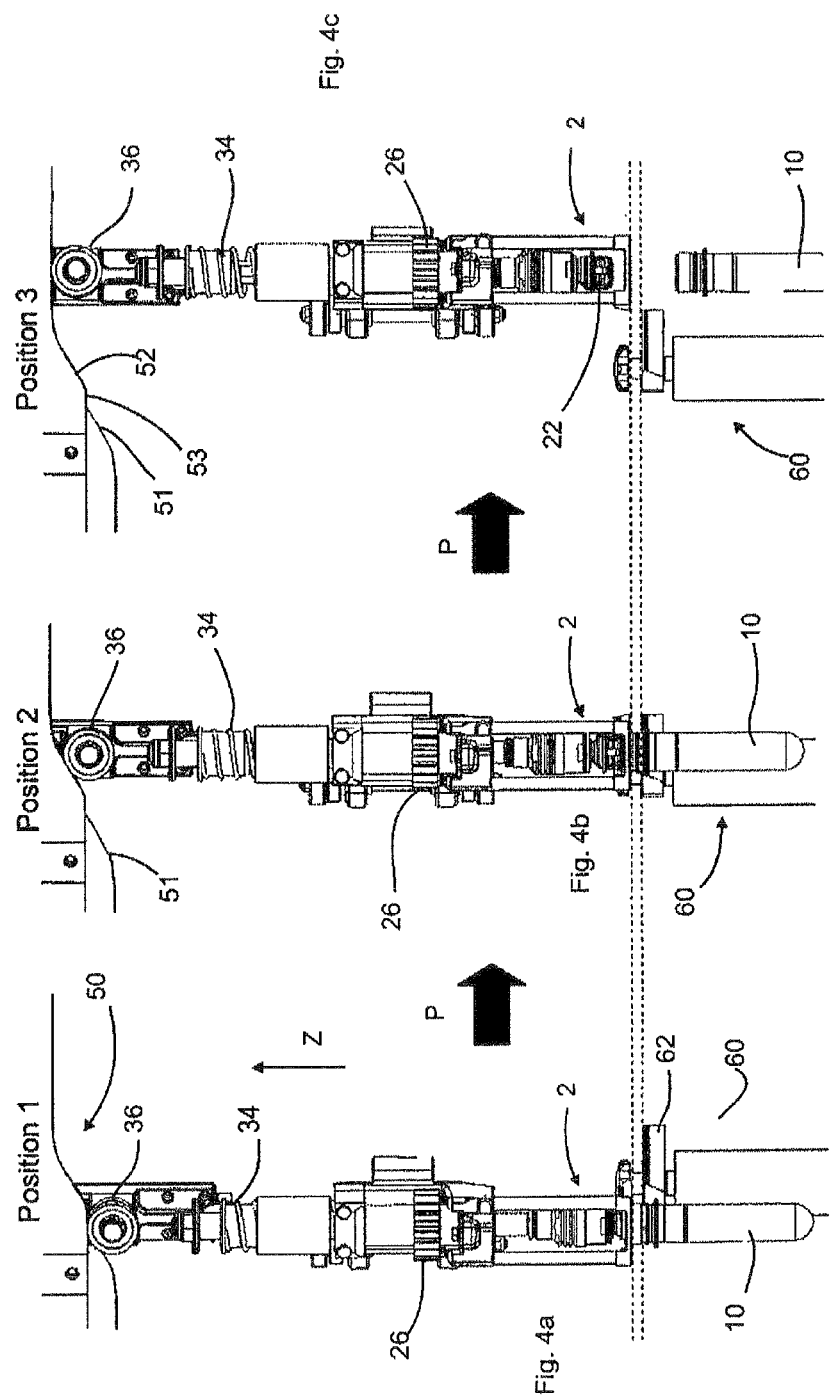

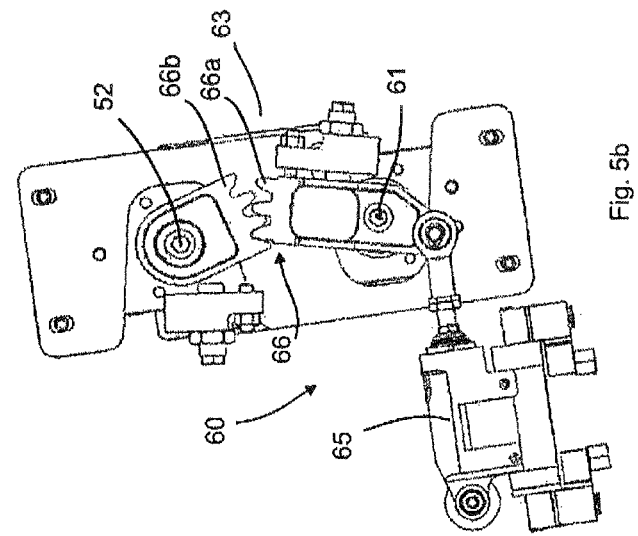
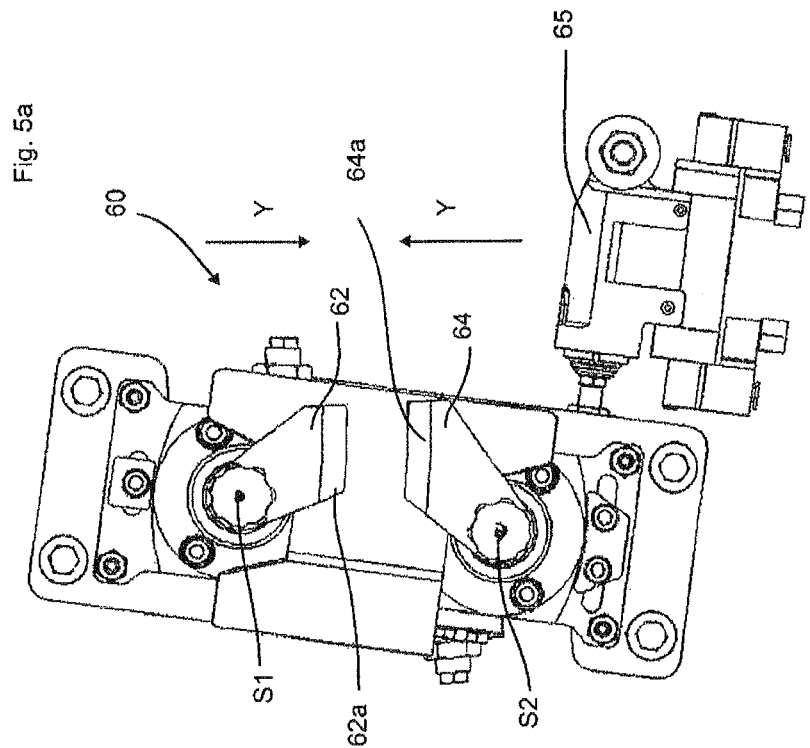

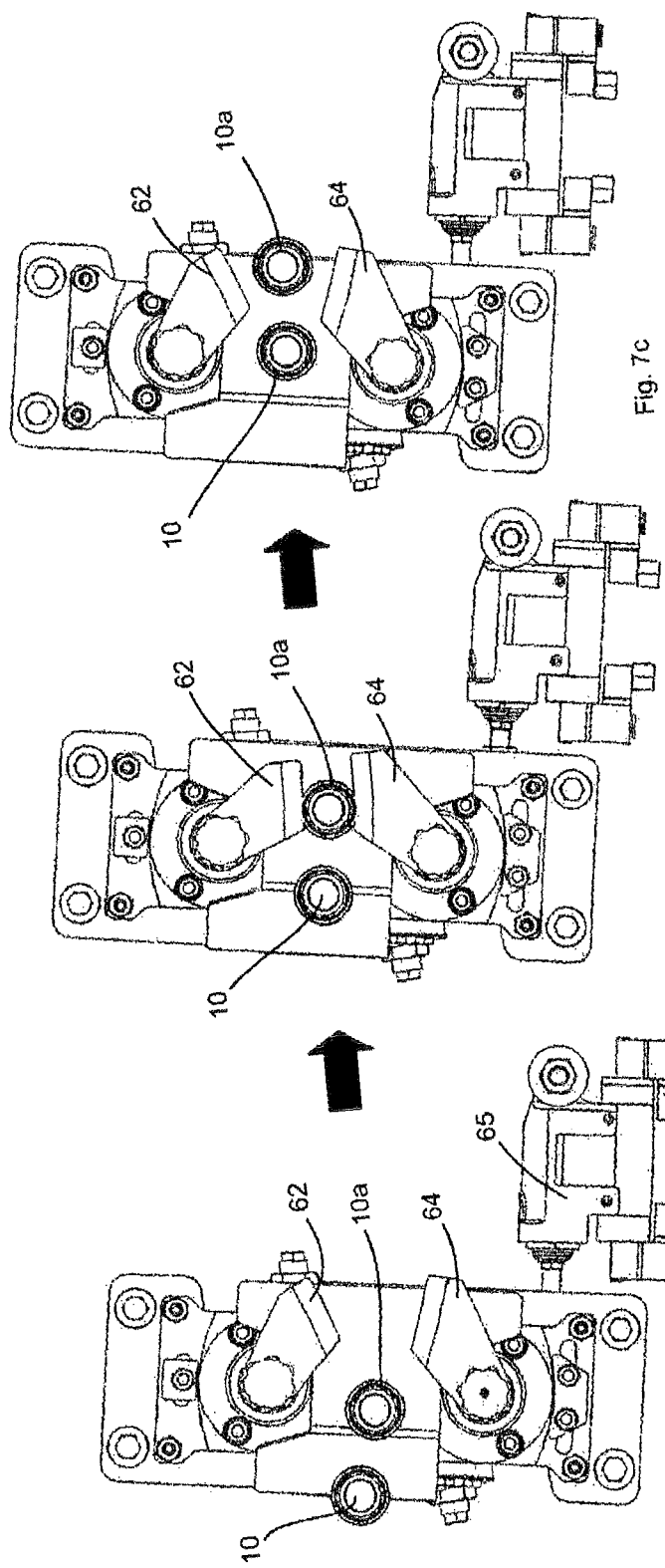

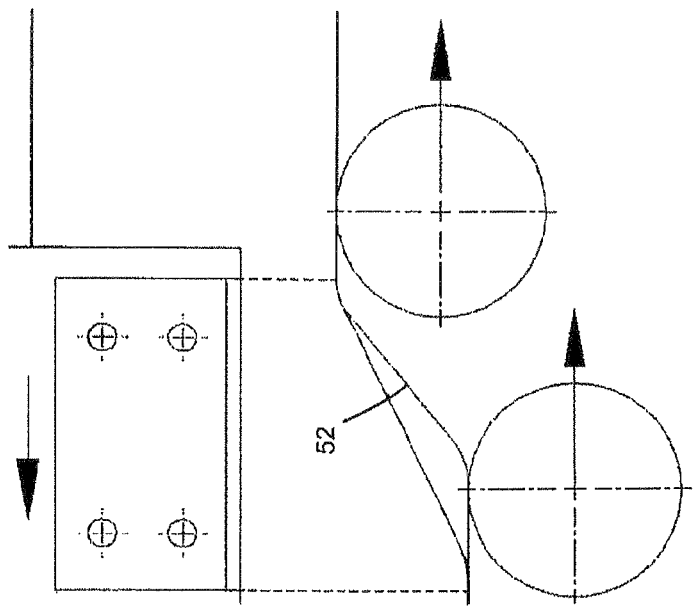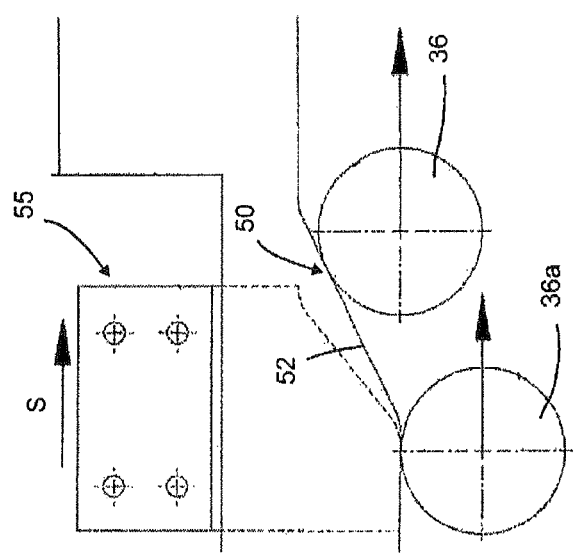

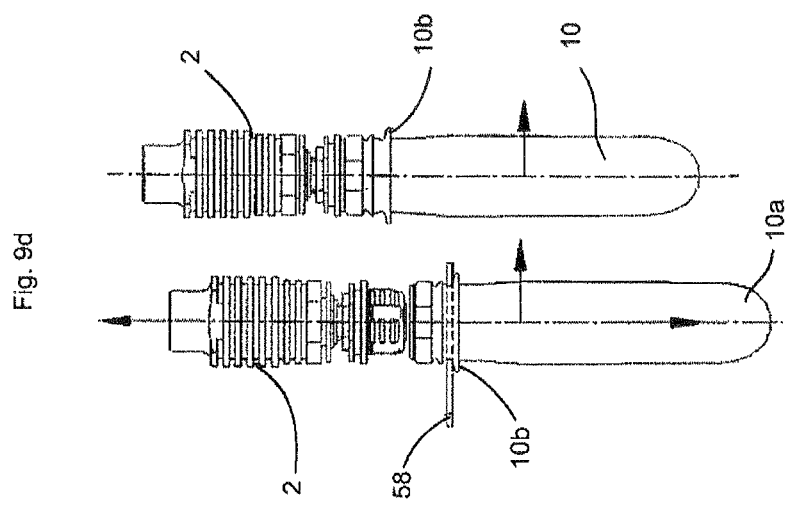
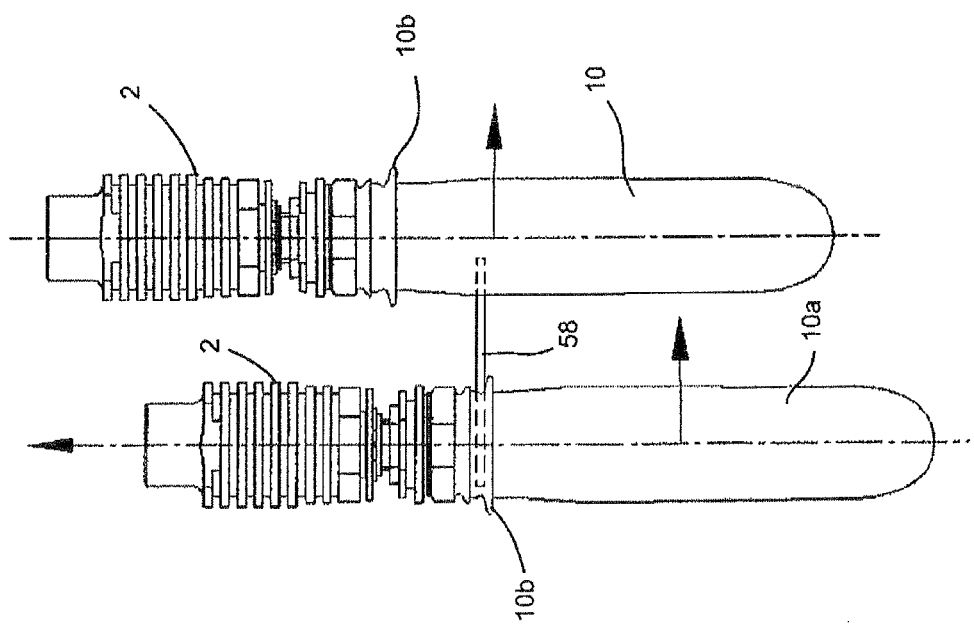

CONVEYING OF PRE-FORMS WITH INDIVIDUAL EJECTION ABILITY

BACKGROUND OF THE DESCRIPTION

The present invention relates to an apparatus for conveying plastics material pre-forms. Plastics material pre-forms of this type are used in the prior art in order to be expanded by being acted upon with blowing pressure to form plastics material containers. For this purpose the plastics material pre-forms are first heated in an oven, in particular in an infrared or microwave oven, in order to be subsequently expanded in this heated state.

For this purpose the plastics material pre-forms are usually held on gripping elements and are conveyed through the oven by these gripping elements. A precise position of the plastics material pre-forms is necessary for error-free and reliable operation of the heating device. In particular, in the case of apparatus of increasingly smaller design, lopsided positioning of the pre-forms for example can result in the heating elements being destroyed or damaged. Unfortunately, such a precise position of the plastics material pre-forms cannot be guaranteed at all times. The object of the present invention is therefore to ensure a reliable operation, in particular of heating apparatus of this type for heating plastics material pre-forms. In particular, the invention should provide the opportunity for allowing the removal of defectively mounted plastics material pre-forms or the discarding thereof. This should also, in particular, be made possible with the requirement of high machine performances and, in particular, it should also be provided in this case that any preceding and following plastics material pre-forms are not likewise adversely affected. In addition, these objects should also be attained in a reliable and inexpensive manner.

SUMMARY OF THE INVENTION

The apparatus according to the invention for the conveying of plastics material pre-forms has a plurality of holding devices which engage in the apertures of the plastics material pre-forms and hold them. In this case these holding devices are movable—in particular on a carrier—along a pre-set conveying path. In addition, a movement mechanism is provided which has the effect that, in addition to the movement along the conveying path, the holding devices are also movable in a direction at a right angle to this conveying path. According to the invention the apparatus has at least one detection device which is suitable for detecting a defective state of a plastics material pre-form held by a holding device, and, in addition, at least one first removal apparatus which is arranged downstream along the conveying path of the detection device and which—in reaction to a signal of the detection device—permits the individual removal of this plastics material pre-form from the holding device holding it and/or at least one first (position) correction device which is arranged downstream along the conveying path (P) of the detection device (40) and which—in reaction to a signal of the detection device—permits a correction of the position of this plastics material pre-form with respect to the holding device holding it.

A plastics material pre-form can usually be held on a gripper, in particular by way of friction locking. During the transfer of the plastics material pre-form, for example by a saw tooth, to an oven, the pre-form gripper—in this case referred to as the holding device—dips into the plastics material pre-form from above and then moves upwards again together with the plastics material pre-form. This is usually controlled by way of the so-called control curve on which a roller is pressed by spring force. The control curve is firmly mounted, whereas the aforesaid parts such as the holding devices are usually mounted in a movable and, in particular, also rotatable manner. As a result, the roller can travel on a control path and performs strokes in this case which are necessary for adapting the desired level. These strokes are also performed in the spindle and thus also in the pre-form gripper by way of friction locking.

A major problem in the operation of a machine of this type is posed for example by plastics material pre-forms which have been mounted obliquely or too deeply. This can occur in various ways during the transfer. In addition, the plastics material pre-form itself can also be made not precisely rotationally symmetrical in itself in terms of its external shape. This lopsided positioning likewise leads to a non-uniform heating profile. Since the plastics material pre-forms are set in a rotary movement during the heating, a tumbling of the obliquely mounted plastics material pre-forms additionally takes place. As mentioned above, this can result in damage to radiant heaters or the plastics material pre-form can—as also in the case of the plastics material pre-form being mounted too deep—in the worst case become detached from the gripper and drop into a heating tunnel.

The invention therefore proposes that defective states of this type should first be detected and after that the plastics material pre-form should be separated from its holding device. A defective state is thus understood as being a badly, for example lopsidedly, mounted plastics material pre-form on the one hand, and, conversely, a plastics material pre-form, defective per se, for example a plastics material pre-form with a curved main body or an aperture not conforming to the standard, on the other hand.

It is advantageous for the apparatus to have a heating device which heats the plastics material pre-forms during the conveying thereof. In this case it is advantageous for the detection device described here and, in a particularly preferred manner, also the removal apparatus to be arranged upstream of this heating device and, in a particularly preferred manner, immediately upstream of this heating device.

It is advantageous for at least the detection device and/or the removal device to be arranged on a portion on which the plastics material pre-forms are conveyed along a segment-shaped conveying path.

The carrier mentioned above can be for example a circulating conveyor chain on which the individual holding devices are arranged. In this case this chain can have reversing wheels at the ends.

In the case of a further advantageous embodiment a rotary device is provided which rotates the plastics material pre-forms about the longitudinal direction thereof.

The detection device can be designed in various ways in this case. In this way, for example, a camera can be provided which detects a defective positioning of the plastics material pre-forms or even a defective plastics material pre-form. In addition, the detection device can be a mechanical element against which for example the plastics material pre-form strikes (if it is incorrectly arranged on the holding device).

The movement mechanism mentioned above is in particular, but not exclusively, a guide curve on which a guide roller in turn runs, it being possible for the above-described movement of the holding device in the direction at a right angle to the conveying path to be achieved by this running of the guide roller.

In the case of a further advantageous embodiment the removal device is arranged so as to be stationary along the conveying path of the plastics material pre-forms. In this way, a mechanically simple design of this removal device can be achieved.

In the case of a further advantageous embodiment it is also possible for the extraction of the plastics material pre-forms to be carried out over a variable segment of the guide curve mentioned above. This is explained in greater detail with reference to the figures. By means of the invention, therefore, a removal of defectively mounted plastics material pre-forms is made possible. In this case, as mentioned, it is possible to provide a switchable segment in a control curve by which a plastics material pre-form can be separated out individually. The individual removal of the plastics material pre-form, as described above, is understood to be that, in particular, preceding and following plastics material pre-forms are not likewise jointly separated out (unless this is desired). It is thus possible for special plastics material pre-forms to be separated out in a purposeful manner.

In the case of a further advantageous embodiment the (at least one) removal device has at least one engagement element for engaging a plastics material pre-form. In this case this engagement element is capable of being supplied to the plastics material pre-form. An engagement element is understood in this case as being an element which contacts the plastics material pre-form mechanically, in particular in order to remove it from the holding device in this way. It is advantageous for the engagement element to be designed in such a way that it engages behind an area of the plastics material pre-form, for example behind the carrying ring thereof. If this happens, the plastics material pre-form can be removed from the holding device by a downward movement of the holding device.

It would also be possible, however, for a correction device, which where necessary corrects a positioning of the plastics material pre-form, to be provided instead of the removal device. In this way, it would be possible for a correction device of this type to have the effect that a badly mounted plastics material pre-form is correctly displaced onto the holding device holding it.

In the case of a further advantageous embodiment the (or at least one) engagement element is capable of being supplied to the plastics material pre-form at least also in a direction which is at a right angle to the conveying path and also at a right angle to the vertical direction named above. In other words, in this case it is preferable for the engagement element to be supplied laterally or transversely to the conveying path of the plastics material pre-forms. In addition, the engagement element is advantageously designed in such a way that it allows a supply to only one specified plastics material pre-form and can then be rapidly withdrawn again, so that the following plastics material pre-forms are not affected.

In the case of a further advantageous embodiment the first engagement element is pivotable about a pre-set pivot axis. It is advantageous in this case for this first pivot axis to be parallel to the axis or the direction in which the holding devices are also movable. In particular, this is a longitudinal direction of the plastics material pre-forms.

In the case of an advantageous removal device a second engagement element is provided, in which case these two engagement elements jointly receive between themselves the plastics material pre-form moved along the conveying path thereof. In this way, for example, these two engagement elements can engage on both sides of the pre-form above the carrying ring and the holding device is thereupon removed.

In the case of a further advantageous embodiment a coupling device is provided which couples the movements of the engagement elements to one another. In this way, the elements can be supplied to the plastics material pre-form on both sides and so a rapid, individual withdrawal of an individual plastics material pre-form is likewise possible. This coupling device can be for example a gear mechanism. An electronic coupling, however, would also be possible (for example by way of servo drives).

In order to generate the movement of the engagement elements it is advantageous for a drive device to be provided. This drive device can be a pneumatic drive device, an hydraulic drive device or even an electric motor drive device or even a magnetic drive device.

In the case of a further advantageous embodiment the movement mechanism causes a movement of the plastics material pre-forms in the direction at a right angle to the conveying path in that region of the conveying path in which the removal device is also situated. In this way, the movement mechanism is designed in such a way that the withdrawal of the plastics material pre-forms is carried out just by this movement mechanism.

In the case of a further advantageous embodiment the apparatus has a second removal device for removing the plastics material pre-forms. It is advantageous in this case for this second removal device to be arranged downstream of the first removal device. In this way, for example, it would be possible to arrange a second removal device with a reversing curve of a heating oven, so that the plastics material pre-forms are ejected at a moment in time at which their heating has not been concluded to the degree that they can no longer be used afresh.

The present invention further relates to a method of conveying plastics material pre-forms. In this case the plastics material pre-forms are conveyed along a pre-set conveying path by means of a plurality of holding devices which engage in apertures in the plastics material pre-forms and hold them, the holding devices also being moved—in addition to the movement along the conveying path—in a direction at a right angle to this conveying path by means of a movement mechanism.

According to the invention a defective state of a plastics material pre-form held by a holding device is detected by means of a detection device, and in reaction to a signal of the detection device this plastics material pre-form is removed individually from the holding device holding it by means of a first removal apparatus arranged downstream along the conveying path of the detection device and/or in reaction to a signal of the detection device a correction of the position of this plastics material pre-form is carried out with respect to the holding device holding it by means of at least one first (position) correction device arranged downstream along the conveying path of the detection device.

BRIEF DESCRIPTION OF THE DRAWINGS

Further advantages and embodiments are evident from the accompanying drawings. In the drawings FIG. 1 is a diagrammatic view of a plant for the treatment of containers with an apparatus according to the invention;

FIG. 2 is a partial view of an apparatus according to the invention;

FIG. 3 is a detailed view of a plastics material pre-form arranged on a holding device;

FIGS. 4a to 4c are three illustrations to show the removal of a plastics material pre-form;

FIGS. 5a, 5b are two illustrations of a removal device;

FIGS. 7a to 7c are three further illustrations of a removal device for a plastics material pre-form;

FIGS. 8a to 8b are two illustrations of a removal device in a further embodiment;

FIGS. 9a to 9d are four illustrations to show a removal procedure, and

DETAILED DESCRIPTION OF THE INVENTION

Figure 6B:
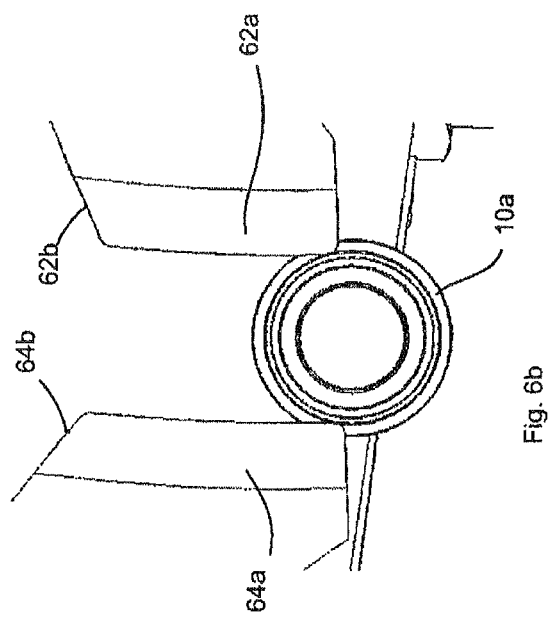
FIGS. 6a, 6b are two further detailed illustrations of a removal device.

FIG. 1 is a diagrammatic illustration of a plant 80 according to the invention for the treatment of containers. In this case a supply device 92 for the plastics material pre-forms is first provided, which can be for example a supply rail which conveys the plastics material pre-forms 10 one directly behind the other.

The reference number 86 designates a so-called single-stroke wheel (referred to as a saw-tooth wheel in this case) which moves the plastics material pre-forms 10 to a constant pre-set distance and conveys them further along the arrow P1. The reference number 94 designates a corresponding wall against which the plastics material pre-forms 10 are guided. The reference number 88 designates the recesses of the single-stroke wheel which are used to receive the plastics material pre-forms 10. The reference number 80 designates the plant in its entirety and the reference number 82 a heating apparatus which is used for heating the individual plastics material pre-forms 10. For this purpose the heating apparatus 82 has a plurality of heating elements or heater boxes 84 arranged stationary. In this case the entire apparatus forms a first heating path 80a and a second heating path 80b. A reversal area 80c (on the right in FIG. 1) is provided between these two heating paths 80a, 80b. The plastics material pre-forms 10 are first transferred from the single-stroke wheel 86 into the first heating path 80a and are then conveyed in the direction of the arrow P through the reversal area 80c and the second heating path 80b. The heating apparatus 82 is adjoined by a further conveying apparatus 96 which transfers the now heated plastics material pre-forms 10 to a shaping device (not shown) for shaping plastics material pre-forms 10 into plastics material containers. This shaping device is preferably a blow moulding machine, in particular a stretch blow moulding machine.

The reference number 40 relates to a detection device which recognizes when a plastics material pre-form 10 is not correctly arranged on the holding device 2 allocated to it.

The reference number 60 designates a first removal device which removes from its holding device 2 a plastics material pre-form 10a which has been detected as being defective. The reference number 1 designates the apparatus according to the invention which has, in particular, the detection device 40 and the removal device 60.

The reference number 70 designates a second removal device which is optionally present and which can be arranged in the reversal area 80c of the plastics material pre-forms 10 in order to remove plastics material pre-forms 10 in this position too where necessary.

In this way, it is preferable for a detection to be carried out before the entry into the first heating path 80a, so that a defectively mounted plastics material pre-form 10a can be ejected beforehand by a further step. This can be carried out both in the aforesaid head member 80d (on the left in FIG. 1), shortly after the transfer from the saw-tooth star wheel 86 or, on the other hand, in a straight portion downstream of the head member 80d. As mentioned, it is also possible for a further removal apparatus 70 to be positioned in the reversal area 80c of the heating module, in order to be able to separate the still usable plastics material pre-forms 10 out of the oven in the event of a possible breakdown on or in the heating module or on machine parts arranged downstream such as the blow moulding machine of the plant. In principle, the plastics material pre-forms 10 can be re-used to a certain heating temperature if they cool. Beyond this temperature re-use is no longer possible and the plastics material pre-forms must then be destroyed.

FIG. 2 is a further illustration of an apparatus according to the invention. In this case the reference number 2 relates to a holding device which holds a plastics material pre-form 10. In this case the holding device 2 engages in the aperture 10c of the plastics material pre-form 10 by way of a holding mandrel 22. The holding is carried out, as mentioned above, in particular by way of friction locking. The holding device 2 can advantageously be rotated in this case about the longitudinal axis L of the plastics material pre-form 10, and this can take place for example by way of a toothed wheel 26.

The reference number 24 designates a carrier on which the holding device 2 and also the corresponding rotating mechanism are arranged. The reference number 28 designates a spindle and the reference number 34 a spring which would force the plastics material pre-form 10 upwards in the event of this spring 34 being stressed. A cam 32 can be moved by control rollers 36 in the direction Z (which is parallel to the longitudinal direction L of the plastics material pre-form 10), i.e. upwards and downwards. The reference number 35 designates a head member pull-out which is likewise pre-stressed upwards by a spring 33. The reference number 30 designates a carrier, in this case for example a reversing roller on which a plurality of the aforesaid holding devices 2 are arranged in succession. In this case these holding devices 2 can be connected to one another in the manner of a chain. In this way, the holding devices 2 are moved along a circular path in this region of their conveying path.

The control rollers 36 can be guided by way of guide curves (not shown) and in this way, depending upon the arrangement of the guide curve, the plastics material pre-form 10 can be pressed downwards or pulled upwards.

FIG. 3 shows a further embodiment of the apparatus according to the invention. In this case the holding mandrel 22, which is a component part of the holding device 2, is again likewise visible. The reference number 25 designates a screening device which covers an aperture of the plastics material pre-form 10c during the passage through the oven, so that an excessive heating of the aperture 10c is prevented.

FIGS. 4a to 4c illustrate a removal procedure of a plastics material pre-form 10. In this case a movement mechanism 50, such as a guide curve here, is provided which in the embodiment shown in FIGS. 4a to 4c has three curve segments 51, 52 and 53.

The reference number 60 relates to a removal device which can remove the plastics material pre-form from its holding device 2. It is evident in the three FIGS. 4a to 4c that in this case the plastics material pre-form is moved past the removal apparatus 60 from left to right (along the conveying path P). The removal apparatus 60 has two engagement elements 62, 64 (only 62 being visible) which engage behind the plastics material pre-form 10, in particular the carrying ring 10b thereof in a specified position (cf. FIG. 4b). If the holding device 2 is lifted upwards, i.e. in the direction Z, the plastics material pre-form 10 will be released from the holding device 2, as shown in FIG. 4c, since the carrying ring face of the defectively mounted plastics material pre-form 10 is situated below the face of the engagement elements 62, 64 of the removal apparatus 60.

In principle, a number of possibilities would now be conceivable in order to carry out a removal of an individual plastics material pre-form. On the one hand, as will be explained in greater detail below, the engagement element 62 could be supplied to the plastics material pre-form and the plastics material pre-form would be removed only in this supplied state. On the other hand, it would also be possible for the movement device or the control curve 50 to be adapted in such a way that the plastics material pre-form is lifted just in the period of time in which the engagement device 62 engages behind it. As stated, it is necessary for incorrectly mounted or defective plastics material pre-forms to be removed. This is carried out in the case of the embodiment shown in FIGS. 4a to 4c with the shape of the control curve 50 and the two switchable engagement elements or withdrawal jaws 62, 64. In the normal case, i.e. with the correct mounting of a plastics material pre-form, the two engagement elements 62, 64 are opened. If the plastics material pre-form is recognized by a checking or detection system 40 arranged upstream as being defective or defectively mounted, the engagement elements 62, 64 move together by way of a cylinder operated pneumatically for example. The control roller 36 follows the track on the control curve 50, at the end of which a slope has been introduced. The extraction of the plastics material pre-forms is then carried out in this slope. When the engagement elements 62, 64 are open, the plastics material pre-forms run through without damage. When the engagement elements 62, 64 are closed, the carrying ring of the plastics material pre-form 10 strikes against the underside of these engagement elements 62, 64 or extraction jaws 62, 64 and is pulled off. The advantage of this procedure lies in the highly favourable force ratios. The drive of the switching segment need not apply additional forces for the compression of a spring or the like.

FIGS. 5a, 5b show a removal device 60 according to the invention. The two engagement elements 62 and 64 or contact portions 62a, 64a respectively, which engage behind the carrying ring 10b of the plastics material pre-form, are in evident. It is evident that these faces 62a, 64a are bevelled in order to prevent a contact of the threaded region of the plastics material pre-form at the same time. The reference letter Y designates the direction in which the engagement elements 62, 64 are capable of being supplied to the plastics material pre-forms.

The references S1 and S2 designate pivot axes about which the two engagement elements 62, 64 can be pivoted in order to engage behind the carrying ring 10b of the plastics material pre-form in this way.

The reference number 65 designates a drive device which causes the two engagement elements 62, 64 to pivot.

FIG. 5b is a view of the underside of the removal apparatus 60. It is evident that a gear mechanism 66 is provided which couples the movement of the engagement element 62 to the movement of the engagement element 64. The reference number 63 designates a carrier on which the two engagement elements 62, 64 are arranged. Instead of a pneumatic cylinder 65 it is also possible for other drives to be provided, such as for example electrical drives, magnetic drives or hydraulic drives. In addition, the engagement elements 62, 64 could also be brought to each other not by a pivoting movement, but could be brought to each other or removed from each other by a straight-line movement. A pivoting movement could also take place about a different axis, for example an axis which extends parallel to the conveying path P, P1 of the plastics material pre-forms.

A pivoting of the engagement element would also be possible in a plane which extends from the conveying path P and the direction Z.

The two engagement elements 62, 64 are connected to tooth segments 66a, b by means of mounted shafts. The outer tooth segment 66a is, as mentioned above, coupled to the drive 65 which in turn is fastened for example to a carrier, such as the furnace for the plastics material pre-forms. As a result of the mounting and the engagement of the tooth segments 66a, b in each other, the engagement elements 62, 64 open (close) as the drive device 65 moves out (moves in). In order to achieve a synchronous opening and closing of the engagement elements 62, 64 of different radius, it is possible for the tooth steps of the tooth segments 66a, 66b to be designed with a specified gear ratio.

A further advantage of the switchable engagement elements 62, 64 is that the switching times and the engagement duration can be adapted or set precisely adapted in a manner dependent upon the performance of the machine (i.e. the conveying speed of the plastics material pre-forms). This allows the system to be used even over the complete performance range of plants customary on the market at present.

Figure 6A:
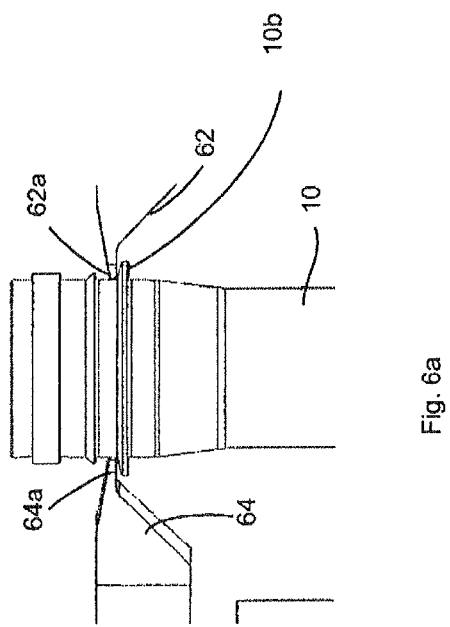

FIGS. 6a, 6b are two further illustrations to show the manner of operation of the removal device 60. The two engagement elements 62 and 64, which are supplied to the container here and engage above the carrying ring 10b of the container, are in turn evident here in FIG. 6a. If the holding device 2 (not shown) is now pulled off upwards, the plastics material pre-form 10 can drop away downwards. More precisely, the two engagement elements or extraction jaws 62, 64 project on both sides of the plastics material pre-form 10 as far as the aperture groove and they can thus engage over the diameter of the carrying ring. In this way, the two engagement elements 62, 64 form a sort of annular groove.

As shown in FIG. 6b, these engagement elements 62, 64 have a certain degree of curvature here, since the plastics material pre-forms move on a track curve. When the two engagement elements 62, 64 are moved together, the control roller 36 is—as mentioned above—in the slope of the control curve and, in this way, the carrying ring 10b of the plastics material pre-form comes into contact with the underside of the engagement elements 62, 64. The springs 34 (cf. FIGS. 4a to 4c) of the spindle now pull upwards on account of the slope in the control curve 50. The carrying ring 10b, however, is still below the engagement elements 62, 64 and, as a result, cannot follow the spindle 28 or the heating mandrel 22 respectively in the vertical direction, i.e. in the pull-off direction. Since the frictional forces are smaller than the spring forces, the holding device 2 or the heating mandrel 22 respectively is released from the aperture 10c of the plastics material pre-form 10.

The plastics material pre-form drops down on account of its own weight.

A support of the procedure would be additionally possible by the application of nozzles which convey the plastics material pre-form in a purposeful manner into a collecting container by an air flow. In the event that the friction forces are nevertheless higher than the spring forces, an emergency curve (a catching segment) is attached which forces the control roller 36 upwards on account of its shape. This ensures that plastics material pre-forms which are mounted very firmly are also removed. If the engagement elements 62, 64 remain in a closed state, in the event of a breakdown an entire series of plastics material pre-forms can also be removed so that they do not move into the heating zone. In this way, the removal apparatus 60 shown here can also act as a removal device or as a separating device respectively for a plurality of plastics material pre-forms.

The references 62b, 64b relate to a run-in slope or run-in rounded portion respectively, which facilitates the supply of the plastics material pre-forms into the region between the two engagement elements 62, 64.

FIGS. 7a to 7c show once again the performance of the removal procedure. In this case the plastics material pre-form 10a situated in front in each case in the direction of the arrow is a defective or defectively mounted plastics material pre-form and the following plastics material pre-form 10 is a proper plastics material pre-form. It is evident (cf. FIG. 7b) that the two engagement elements 62, 64 close at the moment at which the front plastics material pre-form 10a moves through the latter. In this way, the front plastics material pre-form is removed.

As mentioned, the engagement elements 62, 64 thus close only when a defective or defectively mounted plastics material pre-form is present. If a correctly mounted plastics material pre-form follows, then the engagement elements 62, 64 open again (cf. FIG. 7c), so that the proper mounting of the following plastics material pre-form 10 is not adversely affected.

FIGS. 8a, 8b show a further possibility of removing plastics material pre-forms. In this embodiment shown in FIGS. 8a and 8b the guide curve 50 itself changes in its shape. For this purpose a switching device 55 is provided which can be displaced in the direction S (this direction S is also the direction of the conveying path P here). As a result of this displacement the shape of the guide curve 50 changes. As a comparison between FIGS. 8a and 8b shows, the guide curve 50 ascends very much more rapidly in the segment 52 in the situation shown in FIG. 8b than in the situation shown in FIG. 8a.

In a normal case (cf. FIG. 8a) the additional curve is retracted and the guide roller 36, 36a moves on the firmly mounted control curve. If a plastics material pre-form is recognized as being defective in a previous step (for example by way of a metal sheet which checks the level of the plastics material pre-form), the switching segment 55 is actuated and it moves in the direction of movement S, i.e. in this case towards the right in FIG. 8a. The acceleration and guidance of the switching segment 55 can be carried out in different ways, for example by way of a pneumatic or hydraulic cylinder. In addition, a gear mechanism with a non-uniform gear ratio, in particular driven by a rotating motor, especially an electric motor, could be used.

As a result of the switching segment 55 moving out, the roller 36a, which moves a defective plastics material pre-form here, stays and, in this way, the plastics material pre-form arranged on it also stays longer at the old level and, as a result, is separated with respect to the different level from the other plastics material pre-forms at this point.

The advantage of this method lies in the highly favourable power ratios. The drive of the switching segment 55 need not exert any additional forces for compressing a spring or the like. In addition, moving out in the direction of travel provides an advantage with the switching time required.

In the case of this embodiment it is thus advantageous for a switching segment 55 to be provided which changes a guide curve 50 and, in particular, changes it in such a way that a level of the plastics material pre-form 10a which is to be separated out changes in comparison with preceding and following plastics material pre-forms 10 during the movement along the conveying path P.

It is advantageous for this to be a switching segment 55 which is movable in a direction which has at least one component in the conveying direction of the plastics material pre-forms or extends in the conveying direction of the plastics material pre-forms.

It is therefore proposed in the case of this procedure that the holding devices 2, on which defective or incorrectly mounted plastics material pre-forms 10a are arranged, should be conveyed at least locally along the conveying path thereof at a level which is different from correctly mounted plastics material pre-forms.

It is advantageous for that area in which the plastics material pre-forms are conveyed with the deviating level to be used to carry out or initiate the removal of the plastics material pre-forms. In the case of a further advantageous embodiment a removal device is arranged in a region of the conveying path in which a vertical position of a plastics material pre-form 10a to be separated out has also been changed with respect to preceding and following plastics material pre-forms 10. In the case of this embodiment it is thus advantageous for a guide curve with at least one switchable segment to be provided which allows two different conveying paths for the plastics material pre-forms to be conveyed, namely in particular the conveying path along which proper plastics material pre-forms are conveyed, and a second conveying path along which plastics material pre-forms recognized as being defective are conveyed. These conveying paths differ in this case in particular with respect to a level of the plastics material pre-forms.

In addition, as described above, the plastics material pre-forms separated out in this way can be removed from the holding device 2 in a manner arranged in any way. It is particularly preferred in this case to use removal rails—in particular arranged in a stationary manner—and thus to use available spring forces in an associated manner. This procedure is described with reference to the following FIGS. 9a to 9d.

Two plastics material pre-forms 10 and 10a, which both move one behind the other along the conveying path, are illustrated in each case in FIGS. 9a to 9d. In this case the defective plastics material pre-form 10a should be removed in each case and not the plastics material pre-form 10.

The reference number 58 designates a removal rail (arranged so as to be stationary). As mentioned above, the preceding plastics material pre-form 10 is a plastics material pre-form classified as being correct, whereas the following plastics material pre-form 10a has been classified by a detection as having to be discarded. The control curve described above with reference to FIGS. 8a and 8b is situated in this case above the holding devices 2 and on grounds of clarify has not been illustrated once again. The removal rails 58 project on both sides of the plastics material pre-form as far as the diameter of its base body and thus project beyond the diameter of the carrying ring. As mentioned above, in this case the two removal rails 58 can form a sort of annular groove, the curvature being advantageous since they also move the plastics material pre-forms in the head member on a track curve. It is advantageous for the removal rails 58 also to form a run-in rounded portion (not shown) and thus to extend in the direction of movement only gradually just to the body of the plastics material pre-form.

Figure 9B:
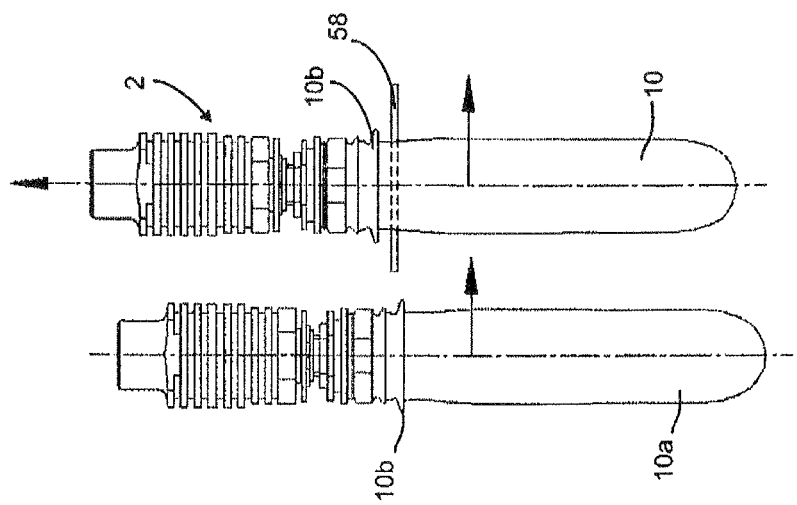
Figure 9A:
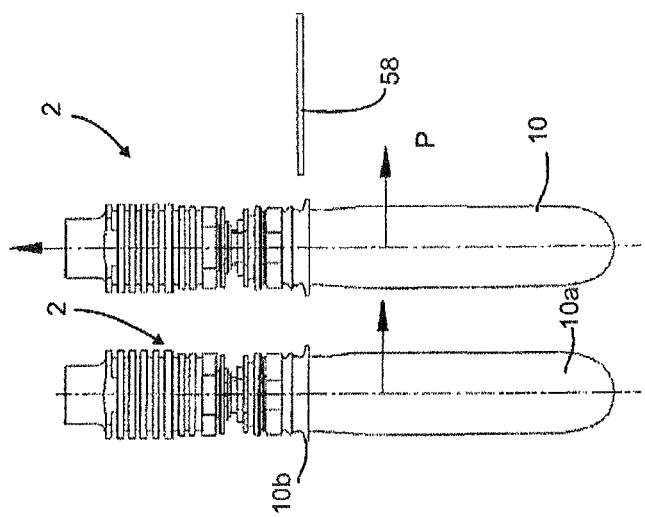
Figure 10B:
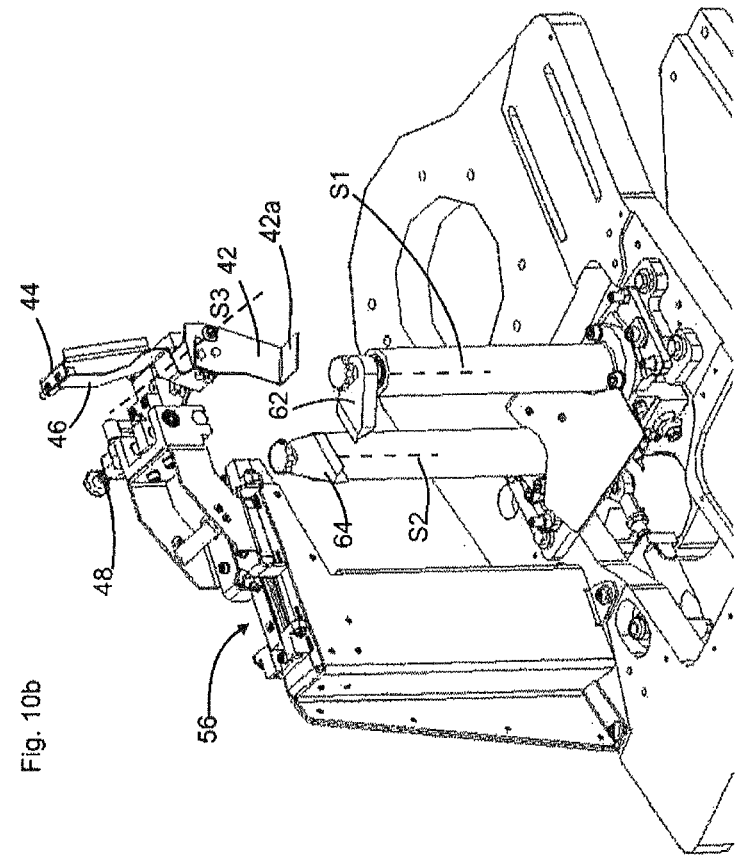
FIGS. 10a to 10g are seven illustrations of an apparatus according to the invention with the detection device.
Figure 10A:
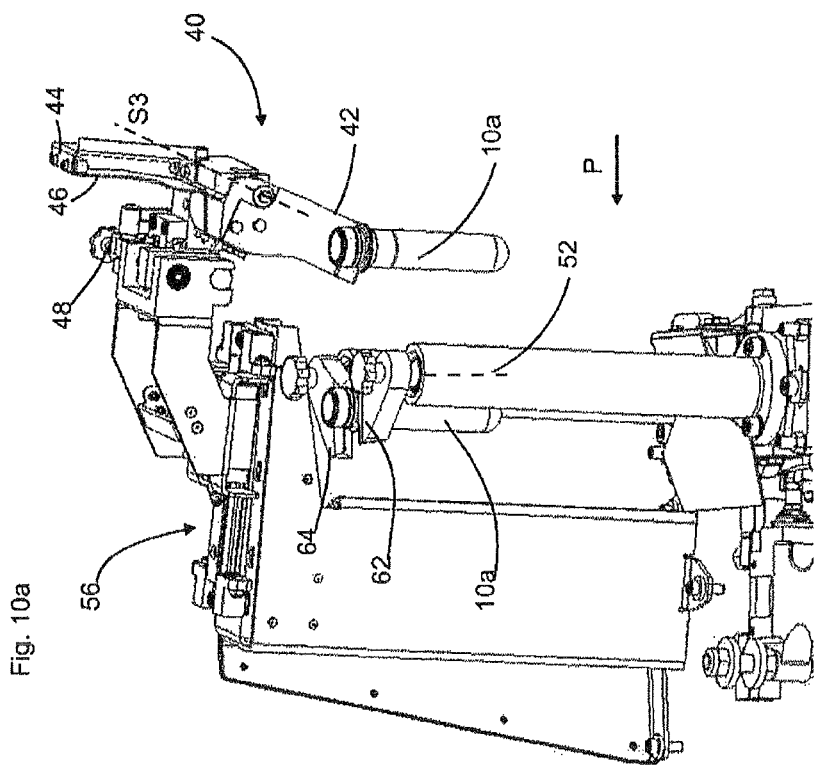
Figure 10D:
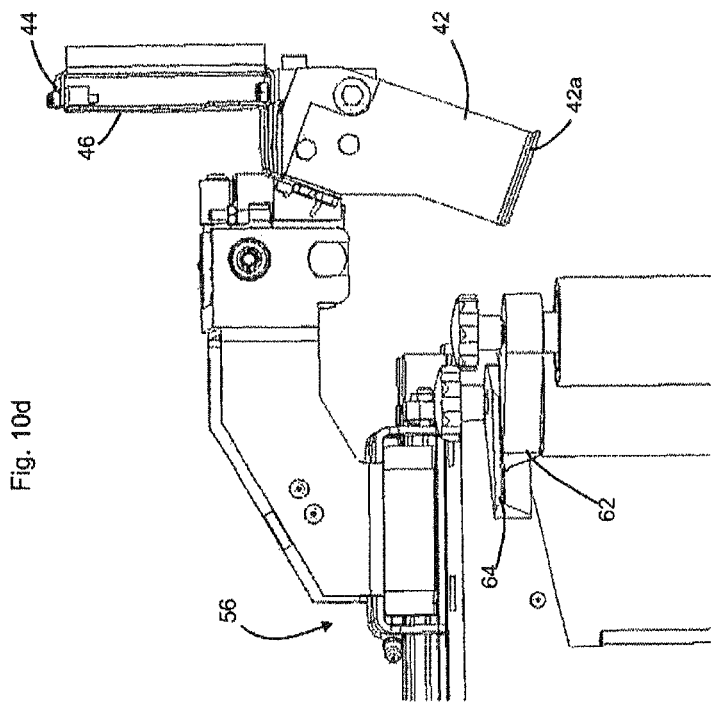
Figure 10C:
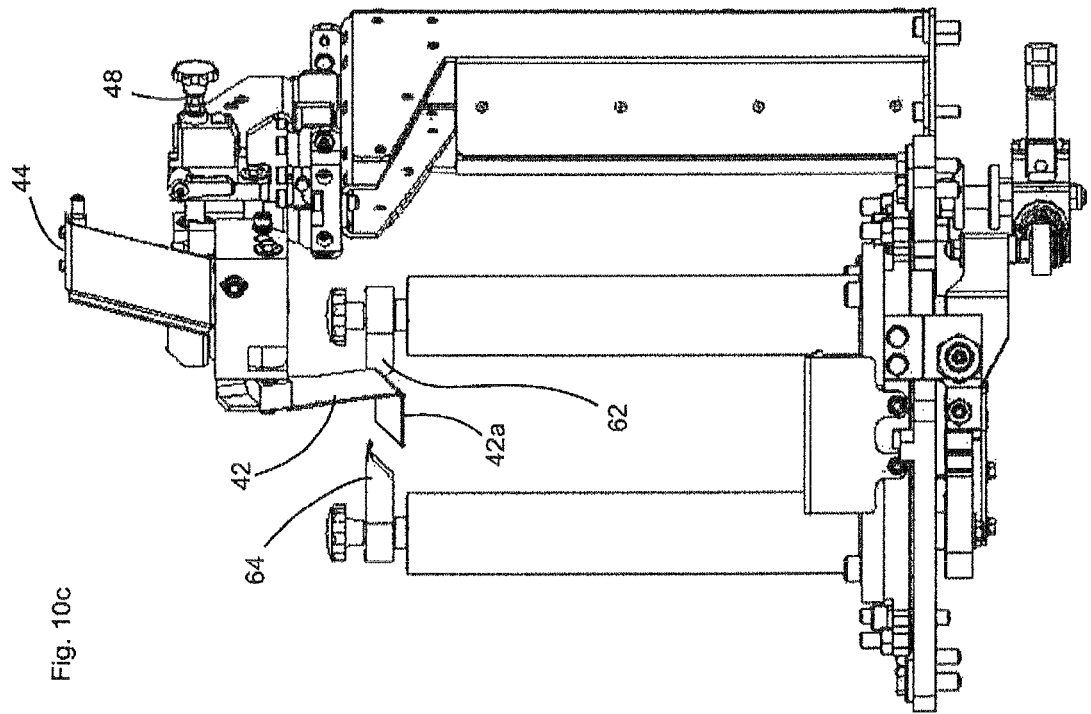
Figure 10F:
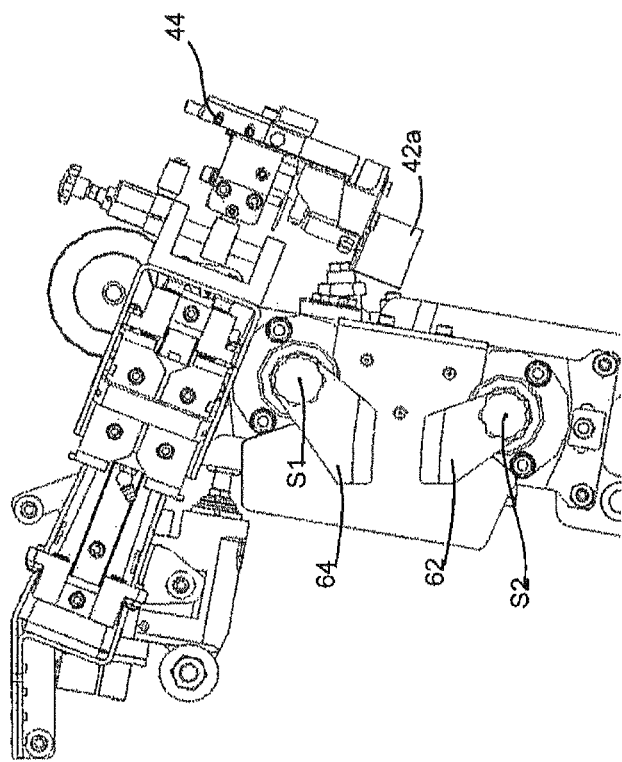
Figure 10E:
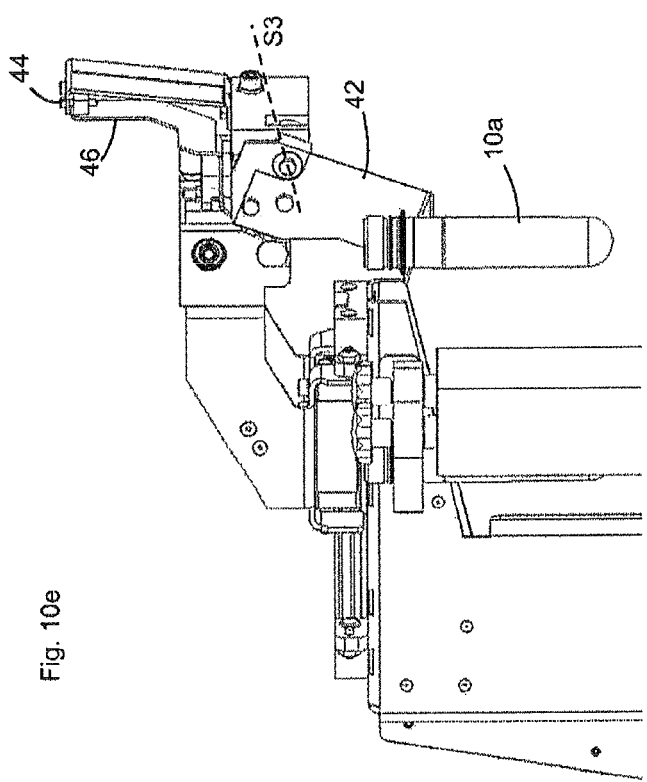
Figure 10G:
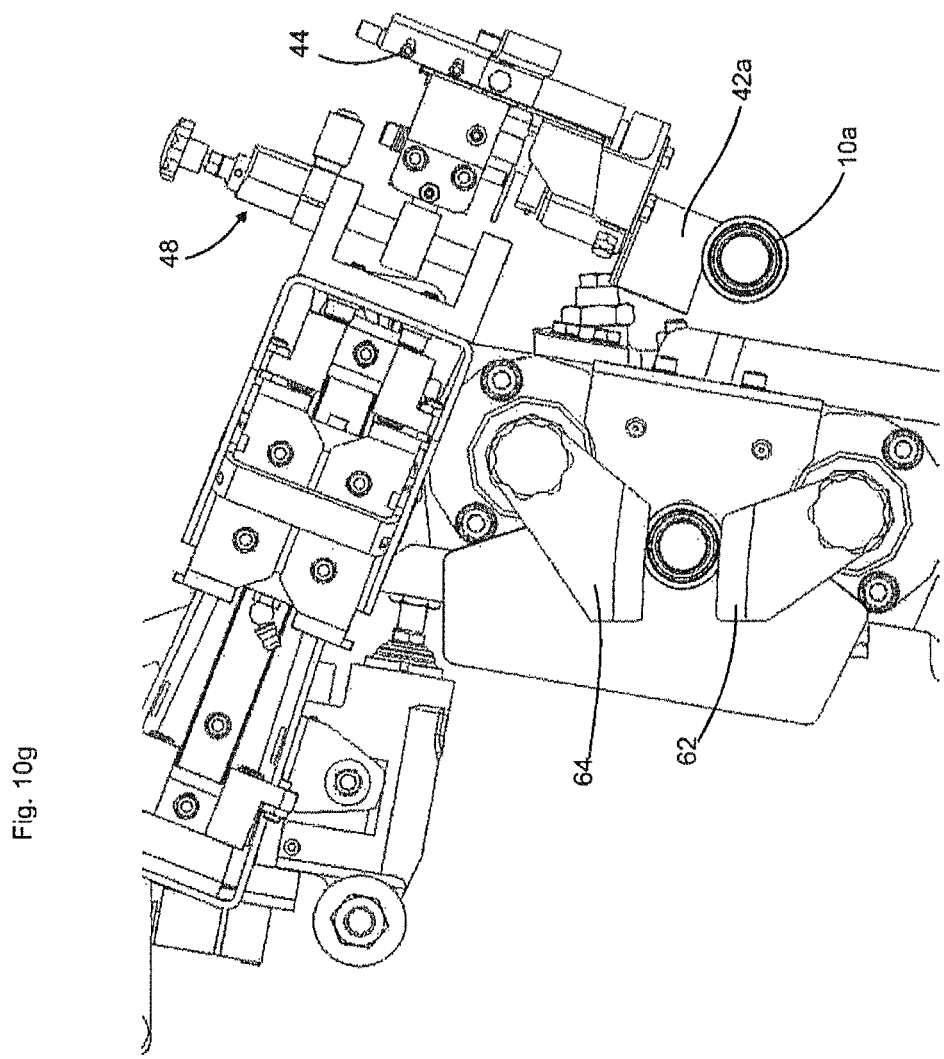

Since the control roller of the front plastics material pre-form 10 rolls on the control curve, the stroke of this plastics material pre-form 10 already starts before the removal rail is reached. As a result, the carrying ring of this first plastics material pre-form 10 also moves above the level of this removal rail 58 before the removal rails 58 project beyond the carrying ring 10b of the plastics material pre-form. This situation is shown in FIG. 9b.

It is different in the case of the plastics material pre-form to be removed, as shown with reference to FIG. 9c. The latter remains longer below the removal rails 58 on account of the extended switching segment 55. In this way, the associated holding device or gripper 2 respectively is moved forward until the removal rails 58 cover a large part of the carrying ring 10b (cf. FIGS. 9c and 9d). Now, however, the springs pull the holding device 2 upwards on account of the shape of the switching segment and the now following run-in of the curve. The carrying ring 10b is now, however, below the removal rails 58 and, as a result, cannot follow the holding device 2. Since the frictional forces are less than the spring forces, the holding device 2 also moves out of the neck of the plastics material pre-form 10a. The latter drops down on account of its own weight. As mentioned above, this procedure can also be assisted for example by nozzles. In addition, an emergency control curve is also possible. This can force the roller upwards on account of its shape, so that even very firmly mounted plastics material pre-forms can be reliably removed.

The switching segment 55 has already been moved into its starting position again at this point in time, so that the following plastics material pre-form can be moved into the heating tunnel again without difficulty. It would also be possible for the switching segment to remain further extended if the next plastics material pre-form is to be removed. In this way, in the event of a defect a number of plastics material pre-forms can also be removed so that they do not enter the heating tunnel.

FIGS. 10a to 10g show seven illustrations of the apparatus according to the invention, in this case a detection device 40 also being illustrated which detects defectively mounted plastics material pre-forms 10a. It is evident that this detection device 40 is arranged immediately upstream of the two engagement elements 62, 64 along the conveying path P. The detection device 40 has in this case a rocker 42 which is mounted so as to be pivotable with respect to a pivot axis S3. It is advantageous in this case for this pivot axis S3 to be at aright angle to a conveying path P of the plastics material pre-forms 10. This rocker 42 is pre-stressed by means of a spring device (not shown) in the position shown in FIG. 10b. A contact element 42a, which does not contact correctly mounted plastics material pre-forms but is contacted by defectively mounted plastics material pre-forms, is arranged on the rocker 42.

As a result of a contact of this type, the rocker 42 pivots and with this rocker 42 a metal sheet or release element 46 respectively arranged on the rocker (this metal sheet 46 thus likewise pivots about the pivot axis S3). The lever arm of this metal sheet 46 is preferably longer in this case than the lever arm of the rocker 42. This means that pivoting of the contact element 42a by a certain amount results in a pivoting of the outer end of the metal sheet by a correspondingly larger amount. If for example the rocker 42 pivots downwards by a few tens of a millimeter in the case of defectively mounted plastics material pre-forms, a switching distance of approximately 1 mm occurs at the metal sheet 46 or the outermost end thereof respectively, and this is sufficient as a switching distance.

The metal sheet in turn contacts an initiator 44 and the drive device 65 is addressed or activated by this contact and, in this way, the two engagement devices 62, 64 are supplied to the plastics material pre-form.

The reference number 48 designates an adjustment element with the aid of which a rocker can be supplied to the plastics material pre-forms in a direction transverse to the conveying path. Since the plastics material pre-forms vary with respect to the diameter of their neck, the rocker 42 can be supplied to different plastics material pre-forms in this way.

The reference number 56 designates a further adjustment device with the aid of which the rocker can be moved closer to the engagement devices 62, 64 or further away from them. It is preferable for the engagement device 40 to be arranged at a distance from the removal device 62, 64 which is between 3 cm and 80 cm, preferably between 3 cm and 60 cm, and preferably between 5 cm and 40 cm.

The detection device is thus preferably designed in such a way that the detection of a defectively mounted plastics material pre-form immediately triggers the removal device 60.

An optical detection device, however, as mentioned above, would also be possible. A detection device of this type could also be arranged at a greater distance from the removal device and could identify for example that holding device which carries a defectively mounted plastics material pre-form. The plastics material pre-form could then be removed from this holding device.

The Applicants reserve the right to claim all the features disclosed in the application documents as being essential to the invention, insofar as they are novel either individually or in combination as compared with the prior art.

LIST OF REFERENCES 1 apparatus for the treatment of containers
2 holding devices
10 plastics material pre-forms
10a plastics material pre-forms, defective
10b carrying ring
10c aperture
22 holding mandrel
24 carrier
25 screening device
26 toothed wheel
28 spindle
30 carrier
32 cam
33 spring
34 spring
35 head member pull-out
36, 36a control rollers
40 detection device
42 rocker
42a contact element
44 initiator
46 metal sheet
48 adjustment element
50 control curve, movement device, guide curve
51, 52, 53 curve segments
55 switching device
56 adjustment device
58 removal rail (arranged stationary)
60 removal device
62, 64 engagement elements/removal jaws
62a, 64a contact portions
62b, 64b run-in slopes/run-in rounded portion
63 carrier
65 drive device/pneumatic cylinder
66 coupling device, gear mechanism
66a, 66b tooth segments
70 second removal device
80 plant
80a first heating path
80b second heating path
80c reversal area
80d head member
82 heating apparatus 84 heater boxes
86 single-stroke wheel, saw-tooth star wheel
88 recess
92 supply device
94 wall
96 conveying apparatus
L longitudinal axis
P1 arrow
P, P1 conveying path
Z direction of movement at a right angle to the conveying path
Y supply direction
S direction of movement
S1, S2 pivot axes
S3 pivot axis of the rocker 42

The invention claimed is:

1. An apparatus for the conveying of plastics material pre-forms, comprising a plurality of holding devices which engage in apertures of the plastics material pre-forms and hold them, wherein the holding devices are movable along a pre-set conveying path (P), a movement mechanism for moving the holding devices along the conveying path (P) and also in a direction (Z) at a right angle to the conveying path (P), the apparatus further having at least one detection device for detecting a defective state of a plastics material pre-form held by a holding device, and at least one first removal apparatus arranged downstream along the conveying path (P) of the detection device and which—in reaction to a signal of the detection device—effects individual removal of a plastics material pre-form from the holding device and/or at least one first correction device arranged downstream along the conveying path (P) of the detection device and which—in reaction to a signal of the detection device—effects correction of a position of the plastics material pre-form with respect to the holding device holding it, wherein the at least one removal device has at least a first engagement element and a second engagement element, wherein the first and the second engagement elements are arranged to receive between themselves and engage the plastics material pre-form as the plastics material pre-form is moved along the conveying path thereto, and wherein the first and the second engagement elements are arranged so as to be advanced to the plastics material pre-form.

2. The apparatus according to claim 1, wherein the at least one removal device is arranged so as to be stationary along the conveying path (P) of the plastics material pre-forms.

3. The apparatus according to claim 1, wherein the first and second engagement elements are arranged so as to be advanced to the plastics material pre-form at least also in a direction (Y) which is at a right angle to the conveying path (P) and also at a right angle to the vertical direction (Z).

4. The apparatus according to claim 1, wherein the first and the second engagement elements are pivotable about a pre-set pivot axis.

5. The apparatus according to claim 1, wherein a coupling device is provided for coupling the movements of the first and the second engagement elements to one another.

6. The apparatus according to claim 1, wherein the movement mechanism causes a movement of the plastics material pre-forms in the direction (Z) at a right angle to the conveying path (P) in that region of the conveying path in which the at least one removal device is also situated.

7. The apparatus according to claim 1, wherein the apparatus has a second removal device for removing the plastics material pre-forms.

8. The apparatus according to claim 1, wherein the first and the second engagement elements are arranged to contact the plastics material pre-form mechanically.

9. The apparatus according to claim 8, wherein the first and the second engagement elements are arranged to contact the plastics material pre-form in order to remove it from the holding device.

10. The apparatus according to claim 8, wherein the first and the second engagement elements are arranged to engage the plastics material pre-form behind an area of the plastics material pre-form.

11. The apparatus according to claim 8, wherein the first and the second engagement elements are arranged to advance to only one specified pre-form, and is arranged to be rapidly withdrawn again so that following pre-forms are not affected.

12. A method of conveying plastics material pre-forms, wherein the plastics material pre-forms are conveyed along a pre-set conveying path (P) using a plurality of holding devices which engage in apertures in the plastics material pre-forms and hold them, and wherein the holding devices are also moved—in addition to the movement along the conveying path (P)—in a direction (Z) at a right angle to this conveying path (P) by a movement mechanism, steps of detecting a defective state of a plastics material pre-form held by a holding device by at least one detection device, providing a signal from the at least one detection device of a defective state of a plastics material pre-form to at least one first removal apparatus arranged downstream along the conveying path (P) of the at least one detection device, and correcting a position of the defective plastics material pre-form, or removing an individual defective plastics material pre-form from the holding device using at least one first removal apparatus arranged downstream along the conveying path (P) of the detection device, wherein the at least one removal device has a first engagement element and a second engagement element, wherein the first engagement element and the second engagement element receive between themselves and engage the plastics material pre-form as the plastics material pre-form is moved along the conveying path thereof, and wherein the first and the second engagement elements are advanced to the plastics material pre-form.

13. The method according to claim 12, wherein the first and the second engagement elements engage the plastics material pre-forms behind an area of the plastics material pre-form.

* * * * *